(12) United States Patent
Iyer et al.

(10) Patent No.: US 11,281,602 B1
(45) Date of Patent: Mar. 22, 2022

(54) SYSTEM AND METHOD TO PIPELINE, COMPOUND, AND CHAIN MULTIPLE DATA TRANSFER AND OFFLOAD OPERATIONS IN A SMART DATA ACCELERATOR INTERFACE DEVICE

(71) Applicant: DELL PRODUCTS, LP, Round Rock, TX (US)

(72) Inventors: Shyamkumar Iyer, Cedar Park, TX (US); Krishna Ramaswamy, Austin, TX (US); Gaurav Chawla, Austin, TX (US); Glen Sescila, Austin, TX (US); Andrew Butcher, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/079,904

(22) Filed: Oct. 26, 2020

(51) Int. Cl.
*G06F 13/16* (2006.01)
*G06F 15/17* (2006.01)
*G06F 15/173* (2006.01)

(52) U.S. Cl.
CPC .... *G06F 13/1668* (2013.01); *G06F 15/17331* (2013.01)

(58) Field of Classification Search
CPC .. G06F 9/30; G06F 12/10; H04N 1/40; H04N 1/00
See application file for complete search history.

(56) References Cited

U.S. PATENT DOCUMENTS

| | | | | |
|---|---|---|---|---|
| 5,991,052 A | * | 11/1999 | Hobo | H04N 1/00206 358/404 |
| 9,503,434 B2 | | 11/2016 | Paris et al. | |
| 10,601,580 B2 | | 3/2020 | Kesarwani et al. | |
| 2001/0014969 A1 | * | 8/2001 | Seki | H04N 21/812 725/1 |
| 2003/0079104 A1 | * | 4/2003 | Bethard | G06F 12/1027 711/207 |
| 2007/0115490 A1 | * | 5/2007 | Yada | H04N 1/4057 358/1.13 |
| 2009/0113011 A1 | * | 4/2009 | Kuribara | G06Q 10/107 709/206 |
| 2011/0032554 A1 | * | 2/2011 | Matsuhira | H04N 1/56 358/1.9 |
| 2011/0035572 A1 | * | 2/2011 | Akizuki | G06F 9/30112 712/208 |

* cited by examiner

*Primary Examiner* — Getente A Yimer
(74) *Attorney, Agent, or Firm* — Larson Newman, LLP (57) ABSTRACT

An information handling system includes a processor and a hardware device. The hardware device includes a first engine to provide a first operation on data, and a second engine to provide a second operation on data. The processor provides a command to the hardware device. The command directs the first engine to perform the first operation on first data to create second data based upon the performance of the first operation on the first data, and directs the second engine to perform the second operation on the second data to create third data based upon the performance of the second operation on the second data in response to a completion signal. The hardware device is configured to provide the completion signal to the second engine when the performance of the first operation on the first data is completed.

18 Claims, 8 Drawing Sheets

SYSTEM AND METHOD TO PIPELINE, COMPOUND, AND CHAIN MULTIPLE DATA TRANSFER AND OFFLOAD OPERATIONS IN A SMART DATA ACCELERATOR INTERFACE DEVICE

FIELD OF THE DISCLOSURE

This disclosure generally relates to information handling systems, and more particularly relates to pipeline, compound, and chain multiple data transfer and offload operations in a Smart Data Accelerator Interface (SDXI) device.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a processor and a hardware device. The hardware device may include a first engine to provide a first operation on data, and a second engine to provide a second operation on data. The processor may provide a command to the hardware device. The command may direct the first engine to perform the first operation on first data to create second data based upon the performance of the first operation on the first data, and may direct the second engine to perform the second operation on the second data to create third data based upon the performance of the second operation on the second data in response to a completion signal. The hardware device may provide the completion signal to the second engine when the performance of the first operation on the first data is completed.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
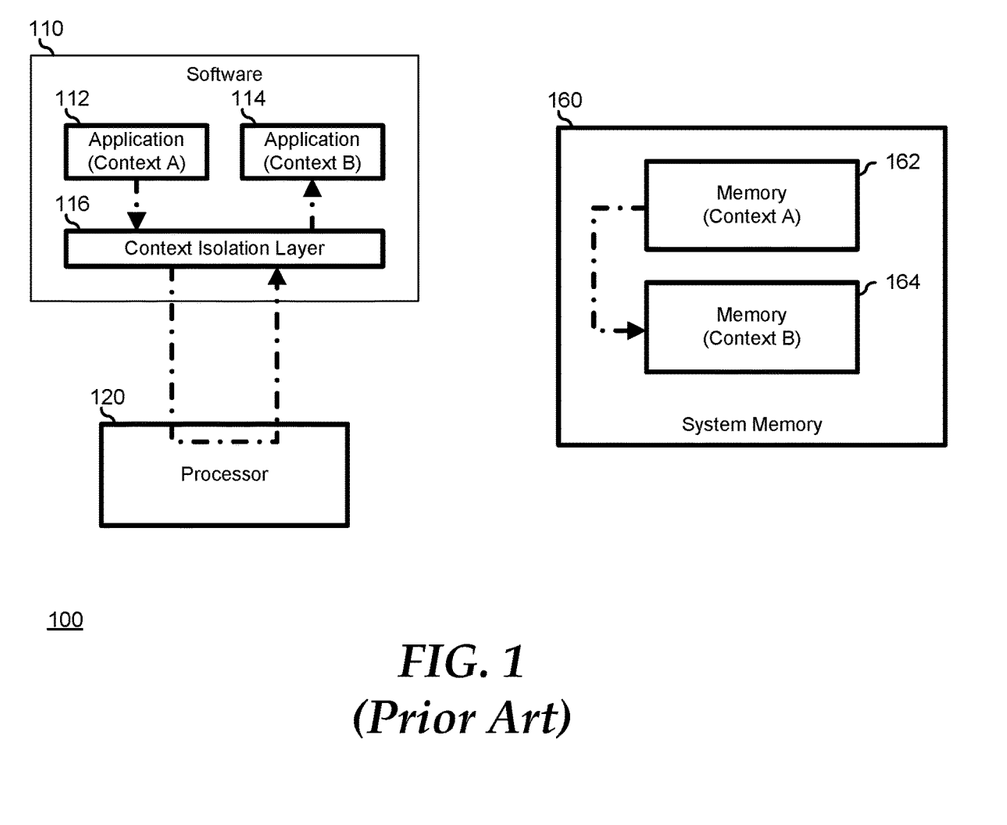
FIG. 1 is a block diagram of an information handling system according to the prior art.

FIG. 1 illustrates an information handling system 100 that utilizes a data exchange architecture in accordance with the prior art. Information handling system 100 includes software 110, a processor 120, and a system memory 160. Software 110 represents machine-executable code stored on information handling system 100 that is executable by processor 120, and includes a first application 112 that is associated with a first context, a second application 114 that is associated with a second context, and a context isolation layer 116. Application 112 is associated with one or more address ranges in the system physical address space (SPA) provided by system memory 160. The address ranges associated with application 112 are collectively shown as a portion 162 of system memory 160. Similarly, application 114 is associated with one or more address ranges in system memory 160, collectively shown as a portion 164 of the system memory. Context isolation layer 116 represents one or more agent, application program interface (API), utility, or the like that operates to maintain the isolation between memory 162 and 164. Examples of context isolation layer 116 may include a system Basic Input/Output System (BIOS) or Universal Extensible Firmware Interface (UEFI), hereinafter referred to collectively as "BIOS," that operates to provide isolated memory ranges for system operations, a virtual desktop system that isolates various memory ranges for the use of multiple users of the virtual desktop system, a hypervisor or virtual machine manager (VMM) that sets up and maintains virtual machines and their associated memory ranges, or the like.

In operation, when applications 112 and 114 are instantiated on information handling system 100, context isolation layer 116 allocates memory 162 and 164 to the use of their respective applications. In addition, when applications 112 and 114 need to interact, for example by moving data from one application to the other, context isolation layer 116 operates to manage the transfer of data between memory 162 and 164.

Note here that the data exchange architecture of information handling system 100 requires the execution of code associated with context isolation layer 116 by processor 120 in order to perform data transfers between memory 162 and memory 164. As such, the prior art data exchange architecture imposes a processing burden on processor 120, thereby reducing the processor cycles available for performing other tasks associated with applications 112 and 114. It will be understood that this processing overhead may be partially mitigated by the inclusion of Direct Memory Access (DMA) hardware in information handling system 100. However, it will be further understood that such DMA hardware is typically a vendor specific add-on, and access to such DMA hardware by applications 112 and 114 directly is typically difficult. In particular, even with the inclusion of DMA hardware, processor 120 is still needed to set up DMA transfers, and context isolation layer 116 is still needed in its role as gatekeeper to system memory 160.

Figure 2:
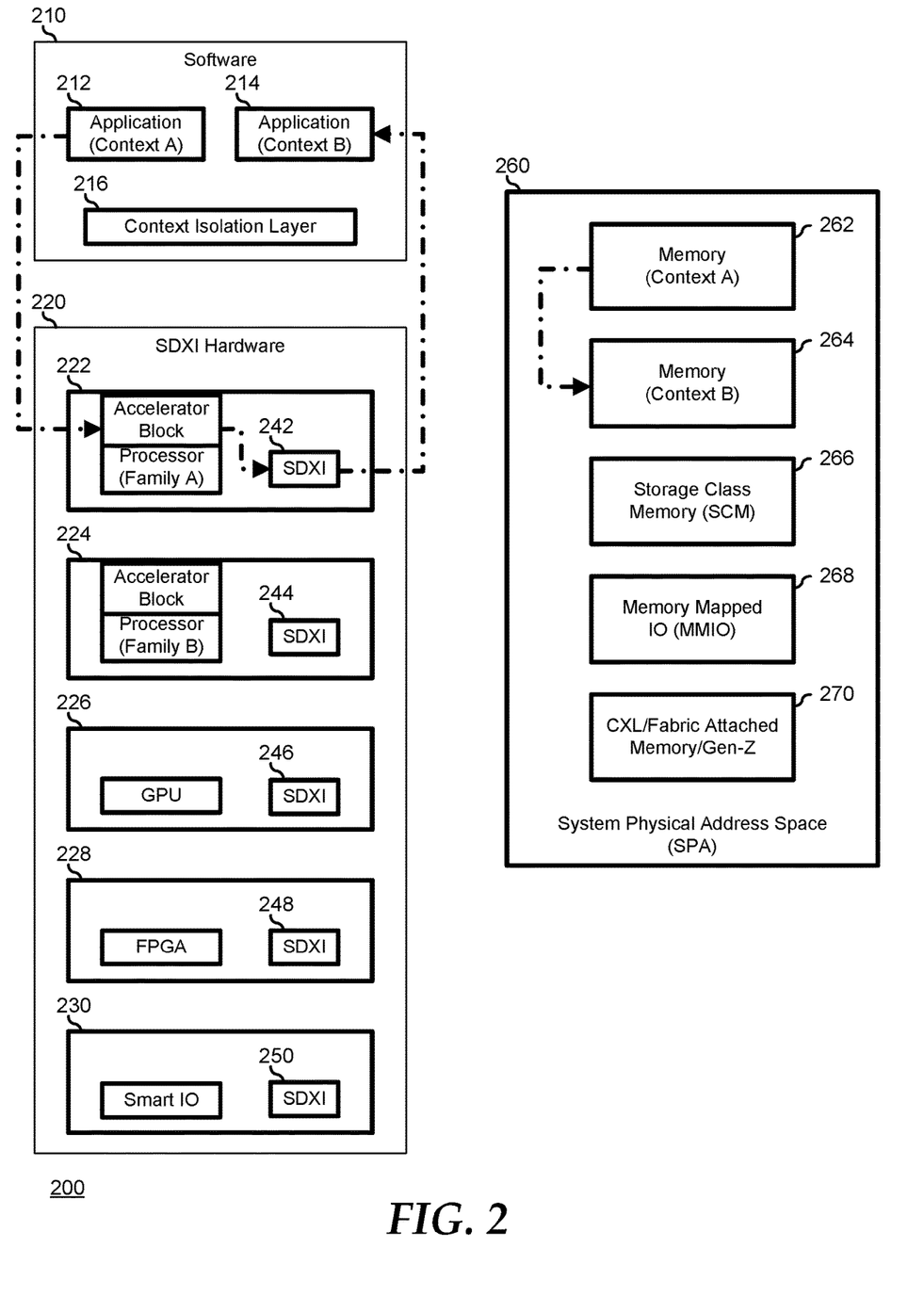
FIG. 2 is a block diagram of an information handling system according to an embodiment of the current disclosure.

FIG. 2 illustrates an information handling system 200 that utilizes a Smart Data Accelerator Interface (SDXI) data exchange architecture in accordance with an embodiment of the current disclosure. Information handling system 200 includes software 210, SDXI hardware 220, and a system physical address space (SPA) 260. SDXI hardware 220 includes a first family of processors 222 and an associated SDXI interface 242, a second family of processors 224 and an associated SDXI interface 244, one or more Graphics Processor Unit (GPU) 226 and an associated SDXI interface 246, a Field-Programmable Gate Array (FPGA) 248 and an associated SDXI interface 248, and a Smart I/O device 230 and an associated SDXI interface 250. Software 210 is similar to software 110, and represents machine-executable code stored on information handling system 200 that is executable by a processor such as one or more of processors 222 and 224. Software 210 includes a first application 212 that is associated with a first context, a second application 214 that is associated with a second context, and a context isolation layer 216. Software 210 may include functions and features similar to software 110, as described above. In particular, software 210 may implement the data exchange architecture of information handling system 100, as needed or desired. As such, application 212 is associated with one or more address ranges in SPA 260, with the associated address ranges shown as a portion 262 of the SPA, and application 214 is associated with one or more address ranges in the SPA, with the associated address ranges shown as a portion 264 in the SPA. Here too, context isolation layer 216 is similar to context isolation layer 116, representing one or more agent, API, utility, or the like that operates to maintain the isolation between memory 262 and 264. As such, context isolation layer 216 operates to allocate memory 262 and memory 264 when respective application 212 and application 214 are instantiated on information handling system 200, and the context isolation layer prevents the use of various memory ranges by unauthorized applications.

The SDXI data exchange architecture represents an industry effort to expand and standardize data movement protocols and hardware accelerator interfaces. As such, information handling system 200 broadens the scope of data exchanges on both the hardware side and the memory side. In particular, on the hardware side, SDXI hardware 220 incorporates various types of processing elements, co-processors, accelerators, and other data movers, as typified by processor families 222 and 224, GPU 226, FPGA 228, and Smart I/O device 230. On the memory side, SPA 260 is expanded to include not only the system physical memory, as typified by memory 262 and memory 264, but also separately attached memory, such as Storage Class Memory (SCM) devices 266, memory mapped I/O (MMIO) devices 268, and memory architectures, such as Compute Express Link (CXL) and Gen-Z memory interfaces, fabric-attached memory, and the like, as shown collectively as memory device 270. In particular, the SDXI data exchange architecture treats all of memory devices 262, 264, 266, 268, and 270 as a single SPA 260. The SDXI data exchange architecture then provides standardized interfaces for data movement between software 210, SDXI hardware 220, and SPA 260. Here, SDXI interfaces 242, 244, 246, 248, and 250 represent hardware and software associated with their respective hardware devices, such that a common set of SDXI commands, instructions, procedures, calls, and the like, referred to hereinafter as "SDXI commands," can be made to the hardware devices. Here, the details of implementing the various SDXI commands can be left to the design requirements and desires of the various hardware manufacturers. In this way, the SDXI data exchange architecture remains extensible and forward-compatible with new hardware or memory developments, and is independent of actual data movement details, data acceleration implementations, and the underlying I/O interconnect technology. The SDXI commands support: data movement between different address spaces including user address spaces located within different virtual machines; data movement without mediation by privileged software once a connection has been established; an interface and architecture that can be abstracted or virtualized by privileged software to allow greater compatibility of workloads or virtual machines across different servers; a well-defined capability to quiesce, suspend, and resume the architectural state of a per-address-space data mover to allow "live" workload or virtual machine migration between servers; mechanisms to enable forwards and backwards compatibility across future specification revisions, allowing software and hardware designed to different specification revisions to interoperate; the ability to incorporate additional offloads in the future leveraging the architectural interface; and a concurrent DMA model. As used herein, SDXI will be understood to represent any present or future specifications, specification revisions, articles, working papers, or other publications of the Smart Data Accelerator Interface (SDXI) Technical Working Group (TWG) of the Storage Networking Industry Association (SNIA).

Figure 3:
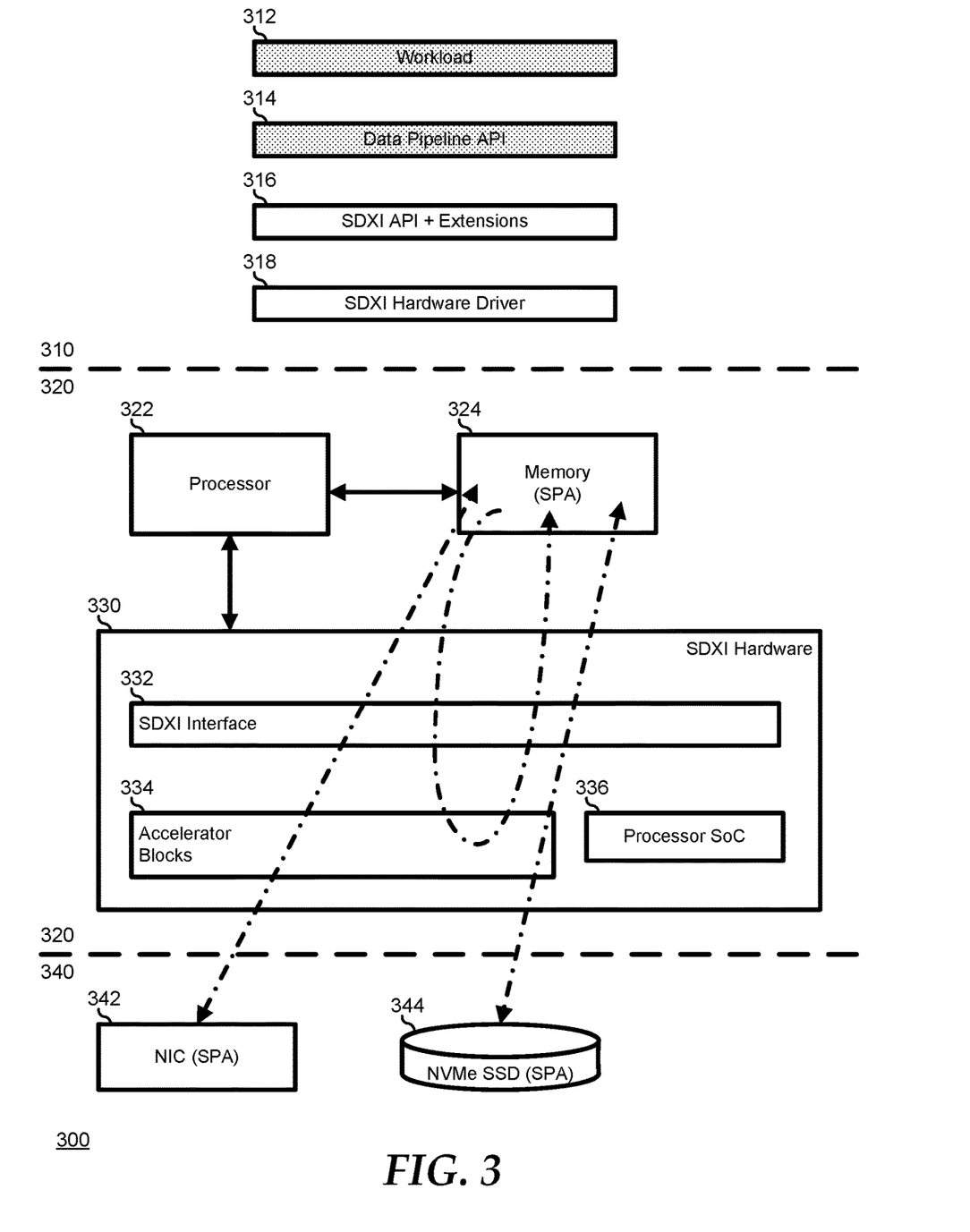
FIG. 3 is a block diagram of an information handling system according to another embodiment of the current disclosure.

FIG. 3 illustrates an embodiment of an information handling system 300 similar to information handling system 200. Information handling system 300 includes a software layer 310, a hardware layer 320, and an attachment layer 340. Software layer 310 is similar to software 210, and includes a workload 312, a data pipeline API 314, a SDXI API 316, and a SDXI hardware driver 318. Hardware layer 320 includes a processor 322, a memory (SPA) 324, and a SDXI hardware device 330. Attachment layer 340 includes a Network Interface Card (NIC) 342 and a Non-Volatile Memory—Express (NVMe) Solid State Drive (SSD) 344. NIC 342 and SSD 344 are each extensions of the SPA space of information handling system 300.

Workload 312 and data pipeline API 314 operate similarly to applications 212 and 214, and context isolation layer 216, and represent elements of a typical information handling system that perform the processing task of the information handling system. In particular, workload 312 operates to perform various operations on data and to move data between different storage and processing elements of information handling system 300, and may make various service calls to data pipeline API to assist in such processing operations and data moves. SDXI API 316 represents an API configured to provide the core operability as specified by a particular revision of an SDXI specification. In addition, SDXI API 316 provides additional extensions to the core operability of the particular SDXI specification, as described below. When workload 312 or data pipeline API 314 invoke SDXI API 316 for the various data operations or data moves, the SDXI API operates to direct SDXI hardware driver 318 to elicit SDXI hardware 330 to perform one or more of the invoked operations or data moves, as needed or desired. In this regard, SDXI hardware driver 318 and SDXI hardware 330 are closely associated with each other.

As such, SDXI hardware 330 represents a wide variety of different types of hardware that can be utilized to perform the SDXI core operations and extensions as described herein. An example of SDXI hardware 330 may include accelerator blocks within a general purpose processor or processor family, such as a CPU or the like, a purpose specific processor, such as a GPU or the like, a logic-based device or state-based device, such as a FPGA, a Complex Programmable Logic Device (CPLD) or the like, a smart I/O device that provides in-line data processing in the course of I/O operations, such as a smart NIC, a Host Bus Adapter (HBA), a storage controller such as a RAID controller, a Network Attached Storage (NAS) device, a Storage Area Network (SAN) controller, or the like, or another processing device, as needed or desired. Here, it will be understood that, SDXI hardware 330 may be configured to provide operations consistent with its type, but that are not specifically associated with its SDXI functionality. For example, where SDXI hardware 330 represents a FPGA type of device, it will be understood that the FPGA device may be invoked to provide functionality of a more general nature, in addition to the SDXI functionality as described herein.

SDXI hardware 330 includes a SDXI interface 332, various accelerator blocks 334, and a processor SoC 336. Accelerator blocks 334 may represent hardware accelerators, logic-based or state-based accelerators, or other configurable or pre-configured accelerator functions, as needed or desired. As described further below, SDXI hardware 330 may operate in some embodiments to provide enhanced data pipelining operations. For example, SDXI hardware 330 may provide data movement: between different locations in memory 324, to and from the memory and a network connected to NIC 342, to and from the memory and NVMe SSD 344, to and from the network and the NVMe SSD, and between different locations in the NVME SSD. SDXI hardware 330 may further operate in some embodiments to provide enhanced data transformation operations on data, either as atomic operations or in conjunction with the data movement utilizing various accelerator blocks 334. In particular, various embodiments of SDXI hardware 330 may provide: data compression/decompression, data encryption/decryption, data checksums, hash functions such as SHA-256 hashes and the like, RAID functions, erasure coding, and the like. Other functions that may be performed by SDXI hardware 330 may include data deduplication, LZ-4 compression, compression ratio and block size optimization, data operation chaining, multi-point data movement, uncompressible block handling, and query analytics.

Figure 4:
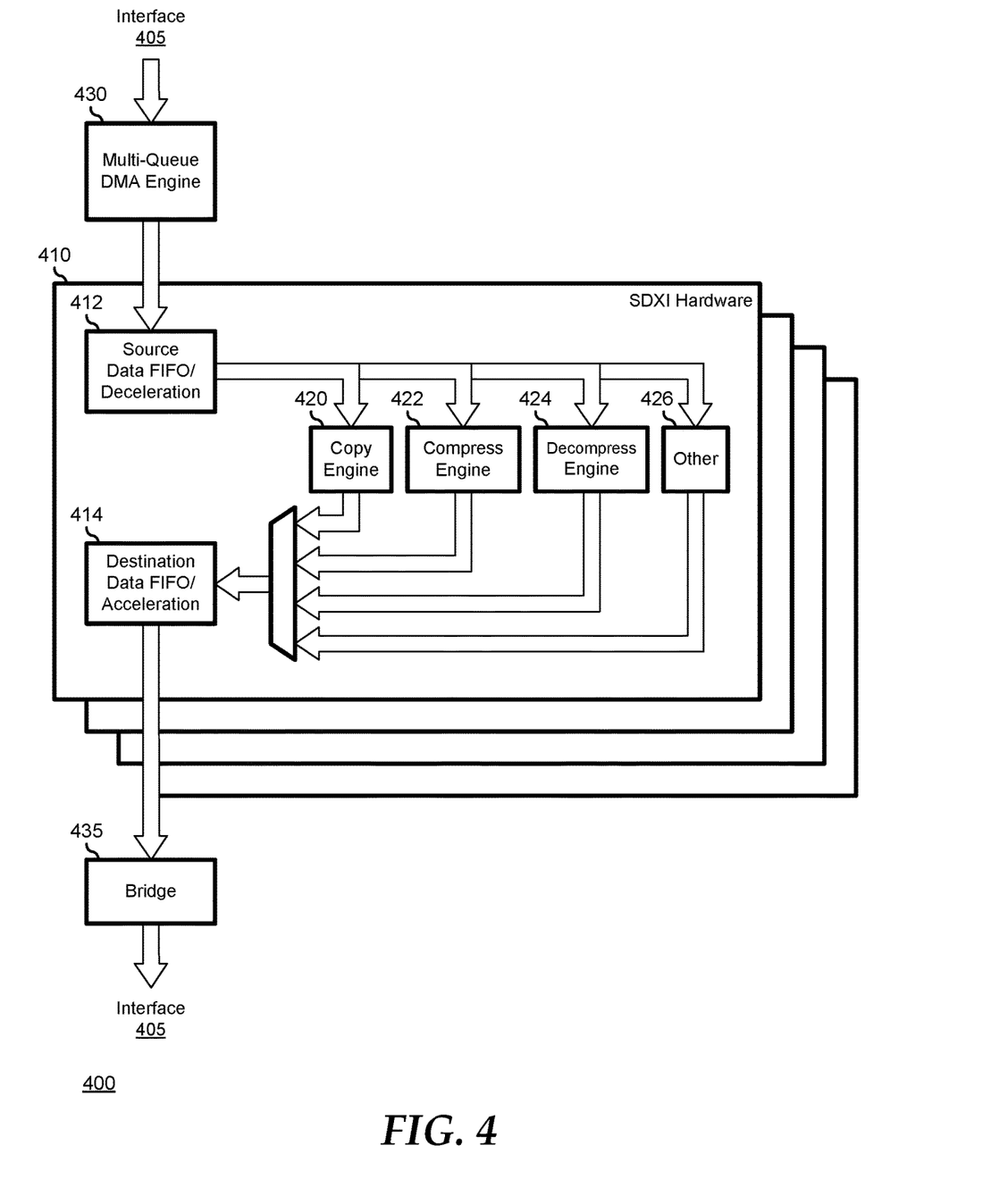
FIG. 4 is a block diagram of an information handling system according to another embodiment of the current disclosure.

FIG. 4 illustrates an embodiment of an information handling system 400 similar to information handling systems 200 and 300. Information handling system 400 includes a processor complex (not illustrated) that provides a communication interface 405 to provide data communications with multiple SDXI hardware devices 410. An example of interface 405 may include a Third Generation Peripheral Component Interconnect—Express (PCIe Gen3)×16 (16-lane) communication link, a PCIe Gen3 communication link with greater or fewer lanes (e.g., ×4, ×8, ×32), or another communication interface, as needed or desired. Information handling system 400 further includes a multi-queue Direct Memory Access (DMA) engine 430, and a data bridge 435. Each of the SDXI hardware devices 410 are connected to receive data and instructions from DMA engine 430, and to provide data and control information to data bridge 435. DMA engine 430 provides dynamic allocation of parallel data flows to the multiple SDXI hardware devices 410, as needed by the processing tasks operating on information handling system 400. The data flows are provided to DMA engine 430 via interface 405, and may be received from memory or storage devices within the SPA of information handling system 400. Data bridge 435 receives the data flows from SDXI hardware devices 410 and communicates the data flows via interface 405 to the memory and storage devices within the SPA of information handling system 400.

Each of the SDXI hardware devices 410 may be understood to be similar hardware devices, such as where the SDXI hardware devices are each provided by a common manufacturer and are a common device type. Here, DMA engine 430 may allocate data flows to the various SDXI hardware devices 410 based upon factors unrelated to the particular device type of the SDXI hardware devices. For example, DMA engine 430 may allocate data flows based upon the resource loading or availability of each of the SDXI hardware devices, the power level or power state of each of the SDXI hardware devices, or other factors not directly related to the type of the SDXI hardware devices, as needed or desired. Further, each of SDXI hardware devices 410 may be understood to be different hardware devices, such as where the SDXI hardware devices are provided by different manufacturers and are different device types. Here, DMA engine 430 may allocate data flows to the various SDXI hardware devices 410 based upon the type of each of the SDXI hardware devices. For example, where a particular SDXI hardware device 410 contains a network function, DMA engine 430 may allocate network based data flows to that particular SDXI function. On the other hand, where a different SDXI hardware device contains a storage controller function, DMA engine 430 may allocate storage based data flows to the other SDXI function.

SDXI hardware device 410 is illustrated as including a source data FIFO/deceleration module 412, a destination data FIFO/acceleration module 414, a copy engine 420, a compression engine 422, a decompression engine 424, and one or more additional engines 426. The configuration illustrated by SDXI hardware device 410 will be understood to be typical, and representative of a wide range of device configurations, as needed or desired. As such, the particular configuration illustrated by SDXI hardware device 410 should not be understood to be limiting on the type, nature, features, configuration, or functionality of SDXI hardware devices in general. Other functions that may be performed by SDXI hardware 410 may include data deduplication, LZ-4 compression, compression ratio and block size optimization, data operation chaining, multi-point data movement, uncompressible block handling, and query analytics.

The inventors of the present disclosure have understood that operations on data, such as data compression/decompression, data encryption/decryption, data encoding/decoding, data deduplication, and the like, are typically performed prior to data egress/ingress operations on a NIC or store/retrieve operations on a storage device. In a first case, such operations may be performed utilizing the resources of the host processing system (CPUs, memory, I/O, etc.), consuming large amounts of those resources that might otherwise be used for other processing tasks. Further, multiple operations may be needed, such as where data stored on a storage array needs to be compressed and then encrypted prior to storage, and then be decrypted and decompressed when retrieved. Here, taking a data storage operation as an example, the data may be 1) received from a storage array, a network, or another source, 2) loaded into a source buffer for a data compressor, 3) compressed, 4) stored to a data compressor output buffer, 5) moved into a source buffer for a data encryptor, 6) encrypted, 7) stored to a data encryptor output buffer, and finally 8) stored to the storage array. Here, the resources of the host processing system may be utilized in each step. Even when portions of the data movement may be handled by a DMA, the resources of the host processing system may be utilized in setting up the data transfers, and in performing the compression and encryption.

The situation is somewhat eased by the advent of Smart I/O devices, such as Smart NICs and Smart Solid State Drives (SSDs) that may offer various accelerations, offloads, and co-processors (referred to herein after collectively as "offloads"). For example, a Smart NIC may include a data compressor/decompressor, or a Smart storage controller may include a data encryptor/decryptor, but the need may still exist for the host processing system to manage the individual Smart devices and to arrange the data transfers as described above. Also, unless the destination for the data is associated with a particular Smart device, the offloads are not typically available more generally. Pipelining of the various operations may be available in limited situations where the flows are provided in standardized formats and the devices operate in accordance with standardized data handling procedures, such as in a family of devices provided by a common manufacturer or in accordance with a common standard. Yet even here, software is typically invoked on the host processing system to manage formatting the data to comport with different data and descriptor formats and the like. For example, where the data needs to be drained to storage (e.g. NVMe, SSDS) or transferred/received from other nodes (NICs), the software may have to deal with NVMe commands, RDMA and NIC descriptor and the like. Thus, even in pipelined operations involving various offloads and I/O devices, the resources of the host processing system are utilized, consuming significant resource cycles for coordination and protocol translation. Hence there remains a need for a framework for combined data manipulation and movement operations with a common front end for the various smart acceleration operations.

As noted above, the SDXI data exchange architecture standardizes data movement operations, and the SDXI hardware devices as described herein extend the SDXI architecture into the SDXI hardware devices that include various offloads for providing operations on the data that is exchanged via the SDXI architecture. In a particular embodiment, the SDXI architecture is extended to include SDXI commands and descriptors for directing not only the data exchanges, but also to include directing the offloads within the SDXI hardware devices, and for chaining and synchronizing data flows through multiple offloads on multiple SDXI hardware devices.

It will be further noted that typical SDXI operations may involve data transfers between system memory, a NIC, a local storage device (SSD), a distributed storage array, or the like. As such, in a particular embodiment, the SDXI architecture is further extended to provide SDXI commands that include descriptors for various I/O interface standards, such as Non-Volatile Memory-Express (NVMe) descriptors for SSD accesses, Remote Direct Memory Access (RDMA) descriptors for NIC accesses, and the like. Here, the SDXI commands are combined to provide pipelined transactions that manage the data flow, from ingress/receive, through the various offloads, and to egress/drain/store.

In a first example, where a particular SDXI hardware device includes I/O interfaces for both ends of a transaction, and further includes the necessary offloads, then a single SDXI command or sequence of SDXI commands can be provided to the SDXI hardware device to set the transfer of the data from the data source, to perform the desired operations in the pipelined order, and to transfer the data from the SDXI hardware device to the data destination. Moreover, if the SDXI hardware device includes a memory or buffer, intermediate results of the various operations may be stored in the included memory or buffer, thereby maintaining all of the data operations within the SDXI hardware device. In this way, intermediate transfers of data to system memory or buffers is reduced, as well. In a second example, where multiple SDXI hardware devices are needed, either because a particular SDXI hardware device lacks the necessary I/O connectivity, or because a particular SDXI hardware device lacks the necessary offloads, then multiple SDXI commands can be provided, one to each element of SDXI hardware that is invoked, setting up the pipeline of the data flow, where the SDXI commands for each downstream SDXI hardware device includes conditional descriptors to wait for the results from the upstream SDXI hardware devices. In either example, where the various offloads are expected to be performed in a particular order, for example where data is to be compressed prior to encryption, then the SDXI commands for each SDXI hardware device may indicate the dependency, as needed or desired. Exemplary I/O pipelining and compounding operations may include:

Compress and Persist
Compress and Encrypt
Compress, Encrypt, and Persist
Compress and Egress
Compress, Encrypt, and Egress
Ingress and Decompress
Ingress, Decrypt, and Decompress
Ingress, Compress, and Persist (e.g., for Just a Bunch Of Flash (JBOF)/Remote Target)
Ingress, Decrypt, Compress, Encrypt, and Persist
Ingress, Decrypt, Decompress, Compress, Encrypt, and Persist
Ingress, Decompress, and Persist (e.g., for JBOF—Only if initiator compresses)
Read, Decompress and Egress (e.g., for JBOF/Remote Target)
Shard, XoR, Compress, and Egress
Ingress, Compress, and Egress It will be understood that other operations can be provided by offloads, as needed or desired. Further, as described further below, such operations as described above, or other operations that can be provided by offloads, may be compounded within a particular SDXI hardware device, or may be chained across multiple SDXI hardware devices, as needed or desired.

Figure 5:
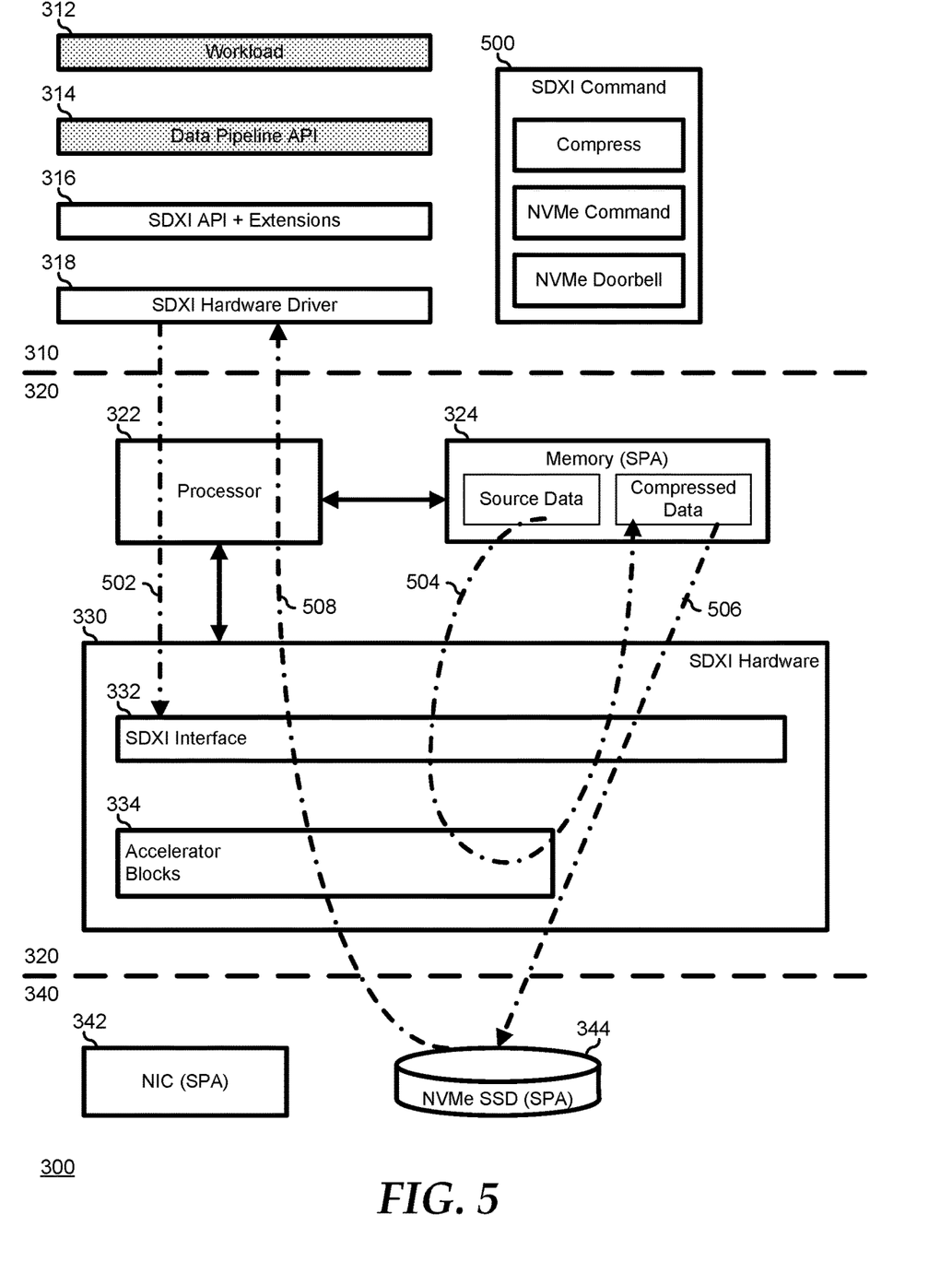
FIG. 5 is a block diagram of the information handling system of FIG. 3, and illustrates a method for pipelining, compounding, and chaining multiple data transfer and offload operations in an SDXI device according to an embodiment of the current disclosure.

FIG. 5 illustrates a method for pipelining, compounding, and chaining multiple data transfer and offload operations in a Smart Data Accelerator Interface (SDXI) device. In particular, information handling system 300 is illustrated providing a method for a combined compress and persist operation. Here, workload 312 provides for data from memory 324 to be compressed and stored to persistent memory (SSD 344). In response, SDXI hardware driver 318 creates a compound pipeline operation command 500. Command 500 includes a compression descriptor that directs SDXI hardware 330 to retrieve the data to be compressed from memory 324, to compress the data, and to place the compressed data back into the memory. Note here that, SDXI hardware 330 may include a memory or buffer that can store the compressed data, in which case, the compressed data would not need to placed back into memory 324. SDXI command 500 further includes a NVMe command descriptor, such as a SDXI payload that can be enqued to a SSD queue in memory 324, in an internal memory of SDXI hardware 330, or in a SSD bar memory such as a Multiple Input/Multiple Output (MIMO) buffer, or the like. The NVMe command descriptor directs SDXI hardware 330 to move the compressed data from memory 324 to SSD 344 upon completion of the compression operation. Finally, SDXI command 500 includes a NVVMe doorbell, such as a SDXI payload to ring a doorbell to SSD 344. Specific fencing bits in the descriptosr defined by the SDXI specification are used to ensure that the NVMe command is processed after the compression operation. In response, SSD 344 returns a normal NVMe completion status that is intercepted in SDXI hardware 330, and the SDXI hardware converts the NVMe completion status into an SDXI completion signal as expected by SDXI Hardware driver 318.

In a first step 502, SDXI hardware driver 318 provides SDXI command 500 to SDXI interface 332. In a second step 504, SDXI hardware 330 enacts the function of the compression descriptor to retrieve the source data from memory 324, to compress the source data, and to return the compressed data to the memory. In a third step 506, SDXI hardware 330 enacts the function of the NVMe command descriptor to store the compressed data to SSD 344. Storing the compressed data includes SSD 344 receiving a doorbell as an SDXI payload, and the SSD performing an NVMe write operation. In a fourth step 508, when the storing of the compressed data to SSD 334 is completed, SDXI hardware translates the NVMe completion to an SDXI completion to provide an indication to SDXI hardware driver 318 that the storage of the compressed data to SSD 344 is complete.

It will be understood that other accelerators may be utilized in providing combined commands similar to SDXI command 500, such as decompress accelerators, encrypt/decrypt accelerators, deduplication accelerators, and the like. It will be further understood that a SDXI command similar to SDXI command 500 may be provided which embeds RDMA commands and RDMA doorbell descriptors, in order to provide a compress and egress combined SDXI command. It will be further understood that a SDXI command similar to SDXI command 500 may be utilized for SSD data reads or NIC data ingresses, in combination with the various accelerator operations, for example, by placing the data read/data ingress commands before the accelerator command. It will be further understood that more than one accelerator command may be provided in a SDXI command similar to SDXI command 500. As such, in a particular embodiment, the ordering of the command fields within a SDXI command may be indicative of the order of performance of accelerations and data movements. In an alternative embodiment, the locations of accelerator command fields and data movement command fields may be fixed within a SDXI command, and ordering may be provided based upon separate order encoding bits within the various fields, as needed or desired. More generally, any and all of the above described exemplary pipelining operations may be understood to be capable of being performed under the present embodiments, and in any order, as needed or desired.

Figure 6:
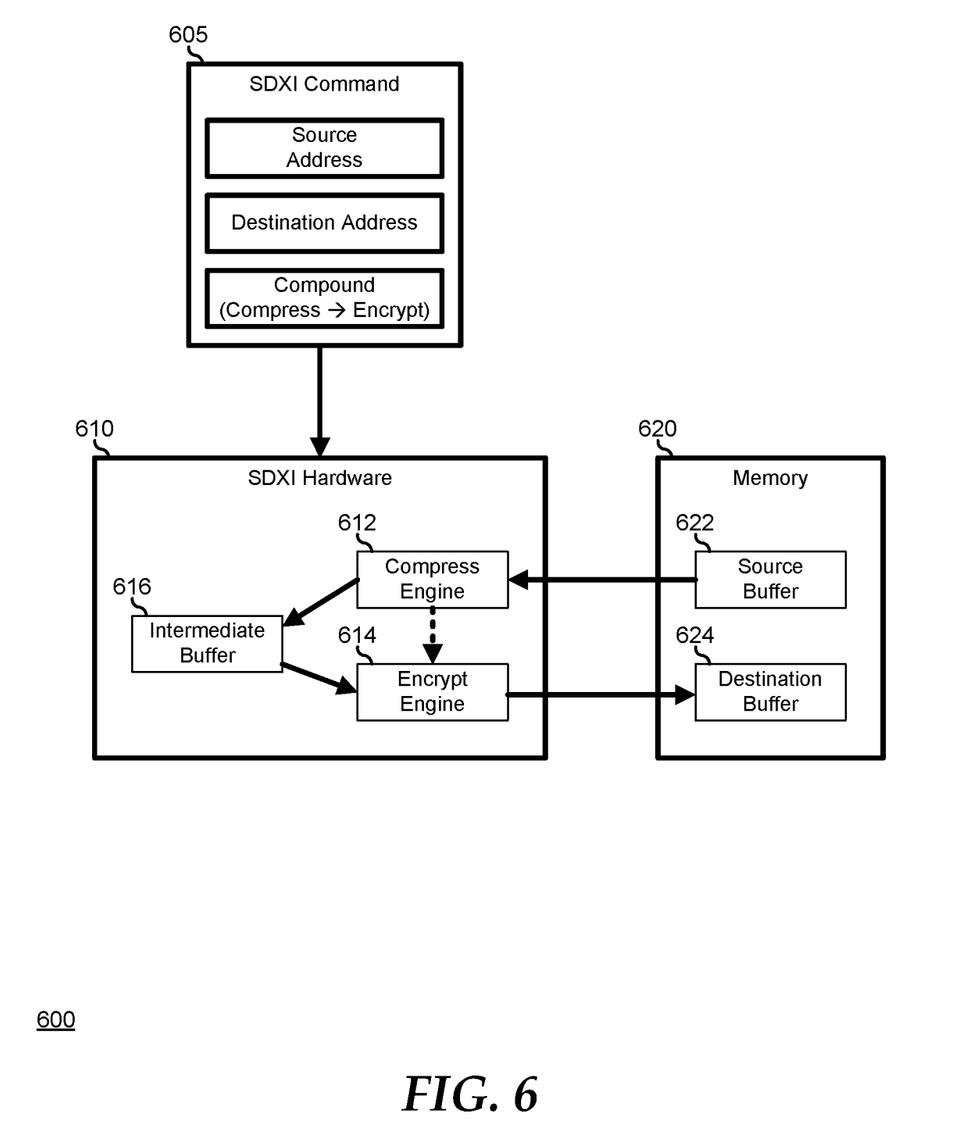
FIG. 6 illustrates a method for compounding operations in an SDXI hardware device according to an embodiment of the current disclosure.

FIG. 6 illustrates a method for compounding operations within a SDXI hardware device. Here, an information handling system 600 includes SDXI hardware device 610 and a memory device 620. In the present example, data from a source buffer 622 of memory 620 is compressed by a compress engine 612 of SDXI hardware device 610 and then encrypted by an encrypt engine 614 of the SDXI hardware device, and returned to a destination buffer 624 of the memory. The compound operation is invoked when a SDXI command 605 is provided to SDXI hardware device 610. SDXI command 605 includes a source address field that identifies source buffer 622 as being the source address of the data to be operated upon. SDXI command 605 further includes a destination address field that identifies destination buffer 624 as being the destination address of the data after being operated upon. Finally, SDXI command 605 includes a compound field that indicates to SDXI hardware device 610 the operations to be performed on the data. Here, the compound field includes "Compress Encrypt." More generally, the compound field may be a field of variable length, depending upon the number of operations are to be compounded. Here, the compound field may be populated based upon an encoding of the various operations (e.g., 0h01=compress, 0h02=encrypt, 0h03=deduplicate, etc.). Here further, an order may be derived based upon the contents of the compound field. For example, a first bit of the encoding may indicate that the encoded operation must be performed first, and a second bit of the encoding may indicate encoded operation must be performed after the preceding encoded operation. As such, the "Compress Encrypt" compound operation may be fully encoded as 0h8142 (0h81—perform compression first, and 0h42—perform encryption after compression).

When SDXI hardware 610 receives SDXI command 605, the SDXI hardware proceeds to retrieve the source data from source buffer 622 in accordance with the contents of the source address in the SDXI command, and directs compress engine 612 to compress the data in accordance with the contents of the compound field. In a first case, where SDXI hardware device 610 includes an intermediate buffer 616, compress engine 612 stores the compressed data into the intermediate buffer. In another case, not illustrated, where SDXI hardware device 610 does not include an intermediate buffer, the SDXI hardware may have an allocated portion of memory 620 for storing the compressed data. In either case, SDXI hardware device 610 continues to direct encrypt engine 614 to encrypt the intermediate data in accordance with the contents of the compound field. Finally, SDXI hardware device 610 stores the encrypted data to destination buffer 624 in accordance with the contents of the destination address in SDXI command 605. It will be understood that offloads other than compress and encrypt may be performed, or that additional offloads may be performed, as needed or desired.

Figure 7:
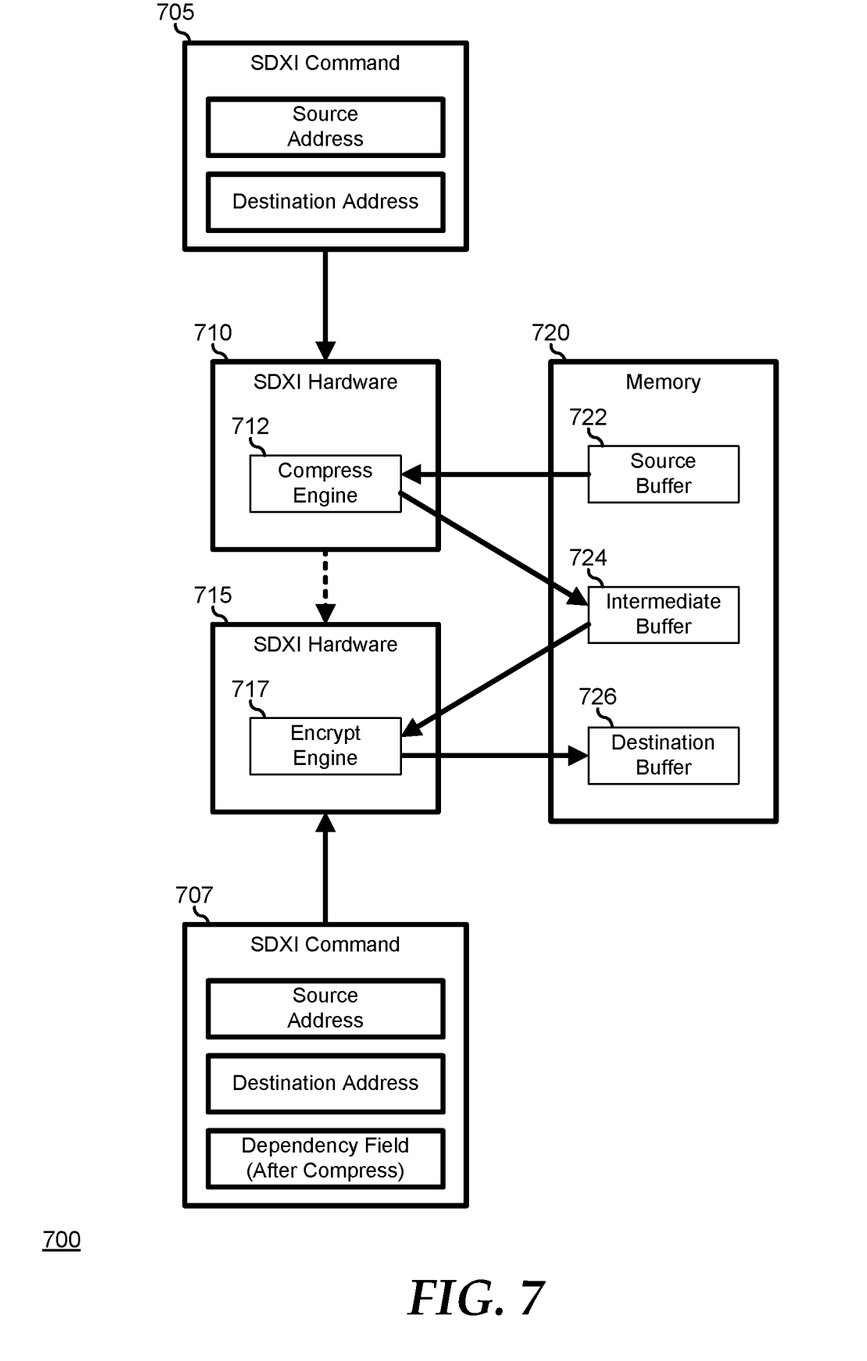
FIG. 7 illustrates a method for chaining operations in multiple SDXI hardware devices according to an embodiment of the current disclosure.

FIG. 7 illustrates a method for chaining operations with multiple SDXI hardware devices. Here, an information handling system 700 includes SDXI hardware devices 710 and 715, and a memory device 720. In the present example, data from a source buffer 722 of memory 720 is compressed by a compress engine 712 of SDXI hardware device 710, stored to an intermediate buffer 724 of the memory, encrypted by an encrypt engine 717 of SDXI hardware device 715 and returned to a destination buffer 726 of the memory. The chained operations are invoked when a first SDXI command 705 is provided to SDXI hardware device 710 and a second SDXI command 707 is provided to SDXI hardware device 715. SDXI command 705 includes a source address field that identifies source buffer 722 as being the source address of the data to be operated upon. SDXI command 705 further includes a destination address field that identifies intermediate buffer 724 as being the destination address of the data after being operated upon by SDXI hardware device 710. SDXI command 705 further includes an operation field (not illustrated) that indicates that SDXI hardware device 710 is to perform a compression operation on the data from source buffer 722. SDXI command 707 includes a source address field that identifies intermediate buffer 724 as being the source address of the data to be operated upon. SDXI command 707 further includes a destination address field that identifies destination buffer 726 as being the destination address of the data after being operated upon by SDXI hardware device 715. SDXI command 707 further includes an operation field (not illustrated) that indicates that SDXI hardware device 715 is to perform an encryption operation on the data from intermediate buffer 724. Finally, SDXI command 707 includes a dependency field that indicates to SDXI hardware device 715 that the operation to be performed on the data from intermediate buffer 724 is dependent upon the prior completion of the operation performed by SDXI hardware device 710. Here, the dependency field may be populated based upon an encoding of the various other SDXI hardware that is available in information handling system 700, and a single bit that indicates that the command invoked by SDXI command 707 must await an indication of completion from the encoded SDXI hardware device.

When SDXI hardware device 710 receives SDXI command 705, the SDXI hardware device proceeds to retrieve the source data from source buffer 722 in accordance with the contents of the source address in the SDXI command, and directs compress engine 712 to compress the data. SDXI hardware device 710 continues to write the compressed data to intermediate buffer 724 in accordance with the contents of the destination address in SDXI command 705. When SDXI hardware device 715 receives SDXI command 707, the SDXI hardware device awaits the completion indication in accordance with the contents of the dependency field. In a particular embodiment, SDXI command 705 may include a dependency field (not illustrated) that instructs SDXI hardware device 710 to provide a completion indication when the compression of the data is complete. In another embodiment, a SDXI hardware driver tracks the progress of the data flow, and provides the completion indication to SDXI hardware device 715 when SDXI hardware device 710 has completed the compression of the data. In either case, when SDXI hardware device 715 receives the completion indication, the SDXI hardware device proceeds to retrieve the compressed data from intermediate buffer 724 in accordance with the contents of the source address in SDXI command 707, and directs encrypt engine 717 to encrypt the data. SDXI hardware device 715 continues to write the encrypted data to destination buffer 726 in accordance with the contents of the destination address in SDXI command 707. In a particular embodiment, SDXI hardware devices 710 and 715 share a common data communication interface, whereby SDXI hardware device 710 operates to provide the compressed data directly to SDXI hardware device 715, without storing the data to intermediate buffer 724. It will be understood that offloads other than compress and encrypt may be performed, or that additional offloads may be performed, and that additional SDXI hardware devices may be invoked, as needed or desired.

It will be understood that the pipelining, compounding, and chaining of multiple data transfer and offload operations, as described above with respect to FIG. 5, the compounding of accelerator operations, as described above with respect to FIG. 6, and the chaining of accelerator operations, as described above with respect to FIG. 7, may be combined as needed or desired. For example, consider a combination where data received at a NIC is to be decrypted with a decryption algorithm associated with network traffic, and decompressed with a decompression algorithm associated with the network traffic, then compressed with a different compression algorithm associated with a distributed storage array and encrypted with a different encryption algorithm associated with the distributed storage array, and then checked for duplicate data on the distributed storage array, and, if the data is unique, finally stored on the distributed storage array. Here, a SDXI NIC can be provided with a compound transfer and offload SDXI command to ingress the data, and to decrypt and decompress the received data with associated engines on the NIC. A SDXI offload device can be provided with a compound offload SDXI command to encrypt and compress the data. This second SDXI command can be chained with the first SDXI command such that the operation is predicated on the completion of the operations in the SDXI NIC. Finally, a SDXI storage device can be provided with a compound offload and data transfer command to deduplicate the data and to store unique data to the distributed storage array. Here, this third SDXI compound command can be chained with the second SDXI command such that the operation is predicated on the completion of the operations in the SDXI offload device. Here, it can be seen that, in comparison with the traditional handling of data flows via host processing system resources, such as processors, memory, and I/O interfaces, the current embodiments allow for complex flow control, data manipulation operations, and data transfer operations, with a minimum utilization of the host processing resources.

Figure 8:
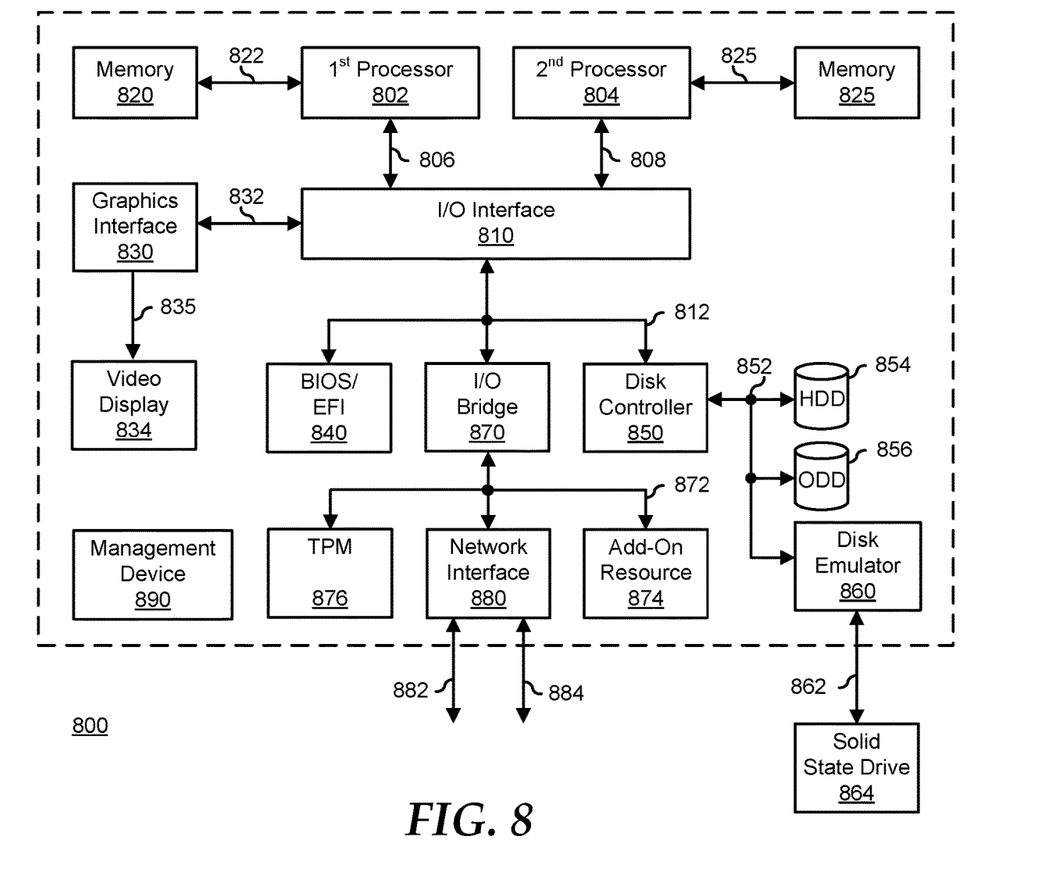
FIG. 8 is a block diagram illustrating a generalized information handling system according to another embodiment of the present disclosure.

FIG. 8 illustrates a generalized embodiment of an information handling system 800. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 800 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 800 can include processing resources for executing machine-executable code, such as a central processing unit (CPU), a programmable logic array (PLA), an embedded device such as a System-on-a-Chip (SoC), or other control logic hardware. Information handling system 800 can also include one or more computer-readable medium for storing machine-executable code, such as software or data. Additional components of information handling system 800 can include one or more storage devices that can store machine-executable code, one or more communications ports for communicating with external devices, and various input and output (I/O) devices, such as a keyboard, a mouse, and a video display. Information handling system 800 can also include one or more buses operable to transmit information between the various hardware components.

Information handling system 800 can include devices or modules that embody one or more of the devices or modules described below, and operates to perform one or more of the methods described below. Information handling system 800 includes a processors 802 and 804, an input/output (I/O) interface 810, memories 820 and 825, a graphics interface 830, a basic input and output system/universal extensible firmware interface (BIOS/UEFI) module 840, a disk controller 850, a hard disk drive (HDD) 854, an optical disk drive (ODD) 856, a disk emulator 860 connected to an external solid state drive (SSD) 862, an I/O bridge 870, one or more add-on resources 874, a trusted platform module (TPM) 876, a network interface 880, a management device 890, and a power supply 895. Processors 802 and 804, I/O interface 810, memory 820, graphics interface 830, BIOS/UEFI module 840, disk controller 850, HDD 854, ODD 856, disk emulator 860, SSD 862, I/O bridge 870, add-on resources 874, TPM 876, and network interface 880 operate together to provide a host environment of information handling system 800 that operates to provide the data processing functionality of the information handling system. The host environment operates to execute machine-executable code, including platform BIOS/UEFI code, device firmware, operating system code, applications, programs, and the like, to perform the data processing tasks associated with information handling system 800.

In the host environment, processor 802 is connected to I/O interface 810 via processor interface 806, and processor 804 is connected to the I/O interface via processor interface 808. Memory 820 is connected to processor 802 via a memory interface 822. Memory 825 is connected to processor 804 via a memory interface 827. Graphics interface 830 is connected to I/O interface 810 via a graphics interface 832, and provides a video display output 836 to a video display 834. In a particular embodiment, information handling system 800 includes separate memories that are dedicated to each of processors 802 and 804 via separate memory interfaces. An example of memories 820 and 830 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 840, disk controller 850, and I/O bridge 870 are connected to I/O interface 810 via an I/O channel 812. An example of I/O channel 812 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 810 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/UEFI module 840 includes BIOS/UEFI code operable to detect resources within information handling system 800, to provide drivers for the resources, initialize the resources, and access the resources. BIOS/UEFI module 840 includes code that operates to detect resources within information handling system 800, to provide drivers for the resources, to initialize the resources, and to access the resources.

Disk controller 850 includes a disk interface 852 that connects the disk controller to HDD 854, to ODD 856, and to disk emulator 860. An example of disk interface 852 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 860 permits SSD 864 to be connected to information handling system 800 via an external interface 862. An example of external interface 862 includes a USB interface, an IEEE 1394 (Firewire) interface, a proprietary interface, or a combination thereof. Alternatively, solid-state drive 864 can be disposed within information handling system 800.

I/O bridge 870 includes a peripheral interface 872 that connects the I/O bridge to add-on resource 874, to TPM 876, and to network interface 880. Peripheral interface 872 can be the same type of interface as I/O channel 812, or can be a different type of interface. As such, I/O bridge 870 extends the capacity of I/O channel 812 when peripheral interface 872 and the I/O channel are of the same type, and the I/O bridge translates information from a format suitable to the I/O channel to a format suitable to the peripheral channel 872 when they are of a different type. Add-on resource 874 can include a data storage system, an additional graphics interface, a network interface card (NIC), a sound/video processing card, another add-on resource, or a combination thereof. Add-on resource 874 can be on a main circuit board, on separate circuit board or add-in card disposed within information handling system 800, a device that is external to the information handling system, or a combination thereof.

Network interface 880 represents a NIC disposed within information handling system 800, on a main circuit board of the information handling system, integrated onto another component such as I/O interface 810, in another suitable location, or a combination thereof. Network interface device 880 includes network channels 882 and 884 that provide interfaces to devices that are external to information handling system 800. In a particular embodiment, network channels 882 and 884 are of a different type than peripheral channel 872 and network interface 880 translates information from a format suitable to the peripheral channel to a format suitable to external devices. An example of network channels 882 and 884 includes InfiniBand channels, Fibre Channel channels, Gigabit Ethernet channels, proprietary channel architectures, or a combination thereof. Network channels 882 and 884 can be connected to external network resources (not illustrated). The network resource can include another information handling system, a data storage system, another network, a grid management system, another suitable resource, or a combination thereof.

Management device 890 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 800. In particular, management device 890 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 800, such as system cooling fans and power supplies. Management device 890 can include a network connection to an external management system, and the management device can communicate with the management system to report status information for information handling system 800, to receive BIOS/UEFI or system firmware updates, or to perform other task for managing and controlling the operation of information handling system 800. Management device 890 can operate off of a separate power plane from the components of the host environment so that the management device receives power to manage information handling system 800 when the information handling system is otherwise shut down. An example of management device 890 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 890 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
a processor;
a first hardware device including a first engine to provide a first operation on data, and a second engine to provide a second operation on data; and
a second hardware device including a third engine to provide a third operation on data;
wherein the processor is configured to provide a first command to the first hardware device, the first command to direct the first engine to perform the first operation on first data to create second data based upon the performance of the first operation on the first data, to direct the second engine to perform the second operation on the second data to create third data based upon the performance of the second operation on the second data in response to a first completion signal, and provide a second command to the second hardware device, the second command to direct the third engine to perform the third operation on the third data to create fourth data based upon the performance of the third operation on the third data in response to a second completion signal; and
wherein the first hardware device is configured to provide the first completion signal to the second engine when the performance of the first operation on the first data is completed; and
wherein the first hardware device is configured to provide the second completion signal to the second hardware device when the performance of the second operation on the second data is completed.

2. The information handling system of claim 1, wherein:
in creating the second data, the first engine operates to modify the first data; and
in creating the third data, the second engine operates to move the second data to an input/output device of the information handling system.

3. The information handling system of claim 2, wherein the first operation includes one of a data compression/decompression operation, a data encryption/decryption operation, and a data deduplication operation.

4. The information handling system of claim 2, wherein the input/output device includes one of a solid state drive (SSD) device, and a network interface device.

5. The information handling system of claim 4, wherein, when the input/output device is an SSD device, the first command includes a non-volatile memory express command.

6. The information handling system of claim 4, wherein, when the input/output device is a network interface device, the first command includes a remote direct memory access command.

7. The information handling system of claim 1, wherein:
the command includes a source address and a destination address; and
the first hardware device is configured to retrieve the first data from a source memory location associated with the source address, and to store the third data to a destination memory location associated with the destination address.

8. The information handling system of claim 1, wherein:
the first command includes a first source address and a first destination address;
the second command includes a second source address and a second destination address, wherein the first destination address and the second source address represent a same memory location;
the first hardware device is configured to retrieve the first data from a source memory location associated with the first source address, and to store the third data to an intermediate memory location associated with the first destination address; and
the second hardware device is configured to retrieve the third data from the intermediate memory location, and to store the fourth data to a destination memory location associated with the second destination address.

9. The information handling system of claim 1, wherein the first hardware device is a smart data accelerator interface device.

10. A method, comprising:
receiving, by a first hardware device of an information handling system, a first command, the first hardware device including a first engine to provide a first operation on data, and a second engine to provide a second operation on data;

performing, by the first engine, the first operation on first data to create second data in response to receiving the first command;

providing, by the first engine, a first completion signal to the second engine when the performance of the first operation on the first data is completed;

performing, by the second engine, the second operation on the second data to create third data in response to the first completion signal; and providing, by the first engine, a second completion signal when the performance of the second operation on the second data is completed;

receiving, by a second hardware device of the information handling system, a second command from the processor, the second hardware device including a third engine to provide a third operation on data;

receiving, by the second hardware device, the second completion signal; and performing, by the third engine, the third operation on the third data to create third data in response to receiving the second command and the second completion signal.

11. The method of claim 10, wherein:

in creating the second data, the method further comprises modifying, by the first engine, the first data; and in creating the third data, the method further comprises moving, by the second engine, the second data to an input/output device of the information handling system.

12. The method of claim 11, wherein the first operation includes one of a data compression/decompression operation, a data encryption/decryption operation, and a data deduplication operation.

13. The method of claim 11, wherein the input/output device includes one of a solid state drive (SSD) device, and a network interface device.

14. The method of claim 13, wherein, when the input/output device is a SSD device, the first command includes a non-volatile memory-express command.

15. The method of claim 13, wherein, when the input/output device is a network interface device, the first command includes a remote direct memory access command.

16. The method of claim 10, wherein:

the command includes a source address and a destination address; and the method further comprises:

retrieving, by the first hardware device, the first data from a source memory location associated with the source address; and storing, by the first hardware device, the third data to a destination memory location associated with the destination address.

17. The method of claim 10, wherein:

the first command includes a first source address and a first destination address;

the second command includes a second source address and a second destination address, wherein the first destination address and the second source address represent a same memory location;

the method further comprises:

retrieving, by the first hardware device, the first data from a source memory location associated with the first source address;

storing, by the first hardware device, the third data to an intermediate memory location associated with the first destination address;

retrieving, by the second hardware device, the third data from the intermediate memory location; and storing, by the second hardware device, the fourth data to a destination memory location associated with the second destination address.

18. An information handling system, comprising:

a processor; and a Smart Data Accelerator Interface (SDXI) hardware device including a first engine to provide a first operation on data, and a second engine to provide a second operation on data;

wherein the processor is configured to provide an SDXI command to the first hardware device, the SDXI command to direct the first engine to perform the first operation on first data to create second data based upon the performance of the first operation on the first data, and to direct the second engine to perform the second operation on the second data to create third data based upon the performance of the second operation on the second data in response to a first completion signal; and wherein the SDXI hardware device is configured to provide the first completion signal to the second engine when the performance of the first operation on the first data is completed.

* * * * *